United States Patent [19]

Dilling

[11] Patent Number: 4,740,590

[45] Date of Patent: Apr. 26, 1988

[54] METHOD FOR PREPARING LOW ELECTROLYTE SODIUM LIGNOSULFONATES

[75] Inventor: Peter Dilling, Isle of Palms, S.C.

[73] Assignee: Westvaco Corporation, New York, N.Y.

[21] Appl. No.: 819,600

[22] Filed: Jan. 17, 1986

Related U.S. Application Data

[63] Continuation-in-part of Ser. No. 657,973, Oct. 5, 1984, Pat. No. 4,590,262.

[51] Int. Cl.$^4$ .......................... C07G 1/00; C09B 67/00
[52] U.S. Cl. ........................................ 530/500; 8/550; 8/587
[58] Field of Search ..................... 530/500; 8/550, 587

[56] References Cited

U.S. PATENT DOCUMENTS 4,590,262 5/1986 Dilling ................................ 530/500

*Primary Examiner*—Delbert R. Phillips
*Attorney, Agent, or Firm*—Terry B. McDaniel; Richard L. Schmalz

[57] ABSTRACT

An improved method of producing sodium salts of low electrolyte-containing lignosulfonates suited for use as dye and print paste additives, comprising the steps of (1) methylolating a sodium salt of a lignin compound in an alkaline aqueous medium by the addition of a suitable methylolating component, such as formaldehyde, (2) adding sulfur dioxide to the methylolated lignin in aqueous medium to lower the pH of the lignin to a pH of between about 6.1 to 6.3, (3) heating the resultant aqueous composition containing the methylolated lignin to sulfonate the same by reaction with a sulfur-containing compounds present therein.

Resultant sodium salt lignosulfonate products suitable as additives in dyestuffs and dyestuff compositions containing such additives are disclosed.

16 Claims, No Drawings

METHOD FOR PREPARING LOW ELECTROLYTE SODIUM LIGNOSULFONATES

This application is a continuation-in-part of my co-pending, commonly assigned U.S. patent application Ser. No. 657,973, filed Oct. 5, 1984, now U.S. Pat. No. 4,590,262, and relates to a method of producing sodium salts of low electrolyte-containing lignosulfonates and to products produced thereby, and, more particularly, to such low electrolyte-containing lignosulfonate dispersants particularly suited for use as dyestuff additives.

BACKGROUND OF THE INVENTION

It is known to employ lignosulfonate compounds as an additive for textile dyestuffs and printing pigments. Such lignin compounds are generally produced as a by-product of the wood pulping industry by either the sulfite (lignosulfonates) or kraft process (alkali lignins which subsequently may be sulfonated). Such sulfonated lignin products provide three basic functions in the dyestuff composition:

(1) They assist in reducing the dye particles to a fine size;
(2) They maintain a dispersing medium for the dyestuff; and
(3) They are used as a diluent.

The advantages of employing sulfonated lignins as dispersants in dyestuff compositions are based on their unique physical properties which include good compatibility with many dye systems, outstanding dispersant characteristics at ambient and elevated temperatures, and availability. There are certain disadvantages in employing lignins, whether they are sulfite lignins or sulfonated kraft lignins, as dispersants. Negative factors in the use of such lignins as dyestuff additives relate to problems of high electrolyte content (when lowered in pH), foaming, high pH, fiber staining, poor heat stability, and high viscosity. These adverse properties are troublesome to dyers and many attempts have been made to overcome these and other disadvantages.

Electrolyte content in specific dyestuff formulations can greatly effect their performance qualities. For example, negative rheological performance has been determined when electrolyte was present in conjunction with hydrophobic dyes. High salt content in the lignin dispersant thus imposes undesirable side effects in such systems. In vat dyes, high salt content in the lignin additives can cause harmful rheological effects during storage of the dyes. The viscosity of the oxidized form in the presence of salts generally increases to a level where the dye mixture can only be removed from a storage container with considerable difficulty. Recent use in this country of double strength dyes over powder dyes has necessitated a reduced application level of the lignin dispersants in order to accomodate the increased amount of dye, thus dictating that the dispersant be in its purest state possible.

A number of technological developments have resulted in new methods and processes to modify sulfonated lignins to reduce the negative aspects of employing such materials as dye dispersants without simultaneously causing any major adverse effects upon those properties which render sulfonated lignins desirable as dyestuff dispersants. The following U.S. patents are directed to reacting and modifying lignins to make them more suitable as dye dispersants: U.S. Pat. Nos. 4,001,202 to P. Dilling et al., 4,184,845 to S. Y. Lin; 4,131,564 to P. Dilling; 3,158,520 to L. A. Baisdell; 3,094,515 to K. F. Keirstead et al; 3,726,850 to Detroit; 2,680,113 to E. Adler et al; 3,769,272 to Hintz; 3,841,887 to Falkehag et al; 4,131,564 to P. Dilling; 4,355,996 to P. Dilling et al; and 4,308,203 to Lin.

U.S. Pat. Nos. 2,525,433; 2,690,973; and 3,503,762 disclose the use of lignins as an additive in printing inks, pastes, and gels. The foregoing patent art is cited to show the state of the art and is not intended to be all inclusive of lignin modifications for use as dye additives.

More recently in my co-pending commonly assigned U.S. patent applications Ser. No. 601,047, now U.S. Pat. No. 4,521,336, and Ser. No. 601,049, now U.S. Pat. No. 4,551,151, filed Apr. 16, 1984, there is described a process for preparing sulfonated lignins particularly suited for use as dyestuff dispersants, and the products produced thereby, wherein the viscosity of sulfonated lignins can be reduced with improvement in heat stability properties by removing the low molecular weight component of the lignin and thereafter sulfonating the resultant lignin material with sodium sulfite ($Na_2SO_3$) and an aldehyde at a pH of about 8.0 to 9.2. Also, in my commonly assigned copending U.S. patent application Ser. No. 532,677, filed September 16, 1983, now abandoned, there is disclosed a process for producing sulfonated lignins for use as dye dispersants and additives, and the products produced thereby, wherein dispersability and heat stability of the lignins are improved by post-sulfonation cross-linking of the sulfonated lignins at controlled lower pH levels, typically a pH of between about 7.0 to 8.5.

In my co-pending, commonly assigned parent U.S. patent application Ser. No. 657,973 filed Oct. 5, 1984, there is disclosed a method of producing low electrolyte sodium salt sulfometnylated lignins for use as dye and print paste additives employing the following steps: (1) lignin material from the black liquor of a kraft papermaking process is ionized and methylolated in an alkaline liquid medium by treatment with an aldehyde compound, (2) the methylolated lignin is treated with an acid, such as $H_2SO_4$, to lower the pH to an acid level and precipitate the methylolated lignin, (3) the precipitated methylolated lignin is washed with water to remove inorganic salts and residual reactants therefrom, and (4) the washed, methylolated lignin is treated with a sulfonating composition, such as a sodium sulfite or sodium bisulfite compound, at an acid pH level to produce a sodium salt sulfomethylated lignin product having low electrolyte content. By reducing the precipitated lignin to an acid level and washing it with water, undesirable inorganic salts and electrolytes are removed from the lignin to produce the improved product suitable for use in dye and print paste compositions.

In the paper industry, lignin is obtained as a by-product from spent pulping liquors, known as black liquor, where lignocellulosic materials, such as wood straw, cornstalks, bagasse and the like are processed to separate the cellulosic pulp from the lignin. The lignins employed in the process of this invention may readily be obtained from the kraft wood pulping process wherein the natural lignin is present as a sodium salt. In kraft pulping, the wood is subjected to the effects of strong alkali. The lignin forms a soluble sodium salt in the alkaline region which is separated from the cellulose and dissolves in the pulping liquor. The lignin is then recovered from the black liquor by acidification. (other sulfate, as well as sulfite, lignins may be employed also.)

Acidification of black liquor containing the lignin salt generally may be accomplished by the introduction of carbon dioxide which converts the phenolic hydroxide groups on the lignin molecule, which are in ionized form, into their free phenolic or acidic form. This conversion renders the lignin insoluble in the black liquor and, as a result, it precipitates out. To precipitate the alkali lignins from the black liquor as water-insoluble products, black liquor initially having a pH of around 13.0 is acidified to about a pH of 9.5 at which point the lignin exists in a precipitated form. The lignin precipitate can be further purified by reducing the pH level to pH 2, where the lignin is coagulated and washed with water to obtain a lignin product identified as "A" lignin.

Lignin obtained from the kraft, soda or other alkaline processes is not recovered as a sulfonated product, but is sulfonated by reacting the material with a bisulfite or sulfite compound. A sulfonated lignin is understood to be any lignin containing at least an effective amount of sulfonate groups to give water solubility in moderately acid and higher pH solutions.

One of the conventional processes for sulfonating lignin involves sulfomethylation of the alkali lignin by reacting the lignin with sodium sulfite and formaldehyde. Such a process is described in Adler et al U.S. Pat. No. 2,680,113. Sulfomethylation acts upon the aromatic phenolic nuclei of the lignin molecule in such a manner that $-CH_2SO_3^-Na^+$ groups are bonded to the aromatic phenolic ring. It is also possible to sulfonate the lignin side-chain of the aromatic nucleus by sodium sulfite treatment of the lignin in the absence of formaldehyde. Sulfomethylation of the alkali lignin has been carried out generally at a pH level of 9.0 or higher, in order to ensure optimum phenol ionization and solubility of the lignin for sulfomethylation.

Although prior art sulfomethylated lignins existed as relatively pure products when sold at a high alkaline pH composition concentration, their use as a dyestuff additive requires adjustment by a dyer to an acidic pH level commonly employed in most textile dyeing by the addition of acid. Since the amount of acid required to either neutralize or acidity the lignin corresponds directly to the electrolyte formation which enters into a given dyestuff formulation, acidification produces increased undesirable electrolytes in the composition. In lowering the pH of the lignosulfonates, the phenolic groups which convert from ionized form to acid form initially produce a buffering effect in the higher alkaline region, such that their initial response to acidification is minimal. This results in large amounts of acid being necessary to initially move the lignin dyestuff additive toward acidic when the starting pH of the lignin compositions is in the higher alkaline range, resulting in corresponding higher amounts of electrolytes being present in the dye composition.

Acidification of the lignin by the dyer not only produces undesirable increases of electrolytes in the dyestuff composition, but also is an added expense to the dyer in preparation of the lignin additive for use.

Difficulties have also been experienced in attempts to use lignosulfonates as additives in synthetic printing pastes. Such printing pastes are highly vulnerable to electrolytes such that, in their presence, printing gel viscosity is reduced causing dyestuff run-off problems during printing. Since lignosulfonate additive compositions typically have exhibited high electrolyte content in printing paste pH applications, they have found only limited utility in such applications.

BRIEF OBJECTS OF THE PRESENT INVENTION

It is an object of the present invention to provide an improved method for manufacturing sodium salts of low electrolyte-containing lignosulfonates which overcomes problems of the prior art.

It is a further object to provide an improved method for producing sodium salts of lignosulfonates particularly suited for use as dye additives and dispersants having reduced electrolyte content.

It is a more specific object to provide a method of producing sodium salts of lignosulfonates for use as dye additives which require less addition of acid to prepare the lignosulfonates for use with the dyestuff.

It is still a further object to provide an improved process for producing sodium salts of lignosulfonates for use as additives in printing paste compositions which can be more effectively employed in printing operations.

It is still another object to provide improved low electrolyte-containing sodium salts of lignosulfonates having excellent solubility and dispersability for use as dye additives in dyestuff printing paste compositions.

It is a further object to provide improved dyestuff and printing paste compositions containing sodium salts of lignosulfonates as a dispersant or additive therein.

SUMMARY OF THE INVENTION

The present invention is directed to an improved method of producing sodium salts of low electrolyte-containing lignosulfonates particularly suited for use as dye and printing paste additives employing the following steps: (1) the phenol component of a lignin material is ionized and methylolated in an alkaline liquid medium, (2) the pH of the liquid medium is lowered to an acid range by addition of sulfur dioxide ($SO_2$) to precipitate the methylolated lignin therefrom, and (3) the lignin is thereafter heated to sulfonate the same. Sulfonation occurs by reaction of the methylolated lignin with sodium sulfite or sodium bisulfite which is formed by the reaction of the $SO_2$ additive with sodium hydroxide and water present in the liquid medium at a pH range of 7.0 or below.

The resultant lignin product having a neutral or acidic pH and low electrolyte content may be employed by a dye formulator directly as a dyestuff additive without need of large amounts of acid to acidify the same, as in the prior art, and without the necessity for the extra addition of acid to lower the pH of the methylolated lignin to precipitate the same for a water-washing step to remove inorganic salts, as in the method of my co-pending U.S. patent application Ser. No. 657,973 filed Oct. 5, 1984. In other words, only one lignin isolation step is required, instead of two as taught by the prior art.

More specifically, the phenol component of the lignin in a liquid medium may be ionized and methylolated at a pH level of between about 10.0-11.2, preferably from about 10.6 to 11.0, by treatment with an aldehyde, such as formaldehyde. The pH of the methylolated lignin is then lowered to a pH range of about 2 to 7, preferably about 6.1 to 6.3, by addition of $SO_2$. The metholated lignin is then sulfonated by heat-treatment reaction with the sodium sulfite or sodium bisulfite compounds formed in the liquid medium by addition of the $SO_2$. The resulting lignosulfonates possess low electrolyte content and exhibit excellent properties as dyestuff dispersants and printing paste additives.

In utilizing $SO_2$ to reduce the pH level of the methylolated lignin to an acidic level where the lignin precipitates from the liquid composition, the $SO_2$ is employed in amounts available to react with sodium hydroxide to form the necessary sodium sulfite or sodium bisulfite for sulfonation of the methylolated lignin. These products react with the methylolated lignin under sufficient conditions to form the desired low electrolyte-containing dyestuff additive products without the necessity of additional acidic treatment and washing step to remove the undesired salts therefrom, as in the parent co-pending patent application.

Low sulfonated lignin products of the present invention, i.e., sodium salts of sulfomethylated lignins having a degree of sulfonation of about 1 mole or less per 1,000 grams of lignin, may be effectively produced with a low free inorganic salt content utilizing only $SO_2$ as the additive to reduce the pH and produce the sulfonation reaction desired. For lignin products of the present invention having a higher degree of sulfonation, i.e., a sulfonation of greater than about 1.6 moles per 1,000 grams of lignin, such products can be produced by the further addition of a sodium salt sulfur-containing compound such as sodium sulfite ($Na_2SO_3$), sodium bisulfite ($NaHSO_3$) or sodium metabisulfite ($Na_2S_2O_5$) during the lignin sulfonation step at the pH range of about 6.1 to 6.3 or by using a higher NaOH level before addition of the $SO_2$.

The products produced by the present invention exhibit much less free inorganic electrolyte content than certain known prior art high and low sulfonated lignin products, i.e, REAX 83 and REAX 85 (products of Westvaco Corporation) which have been found to exhibit a 19 to 22% and a 14 to 17% free organic salt content, respectively, at a pH of about 7.0.

DETAILED DESCRIPTION OF PREFERRED EMBODIMENTS

Whereas the prior art method of sulfomethylation of lignins involved a two step process of (1) ionizing the phenol component of the lignin at an alkaline pH and (2) sulfomethylating the ionized lignin by the addition of formaldehyde and sodium sulfite, and my aforementioned co-pending parent U.S. patent application requires the use of large amounts of acid, such as H2SO4, to reduce the pH to a low level for water-wash removal of the free inorganic salts, the method of the present invention produces a sulfomethylated lignin salt of low electrolyte content without the need of lignin filtration and a water-washing step and the addition of acid due to the availability of the $SO_2$ to provide the sulfonation reagent for the methylolated lignin when the pH level is lowered to the range of from 2 to 7, preferably from about 6.1 to 6.3.

During introduction of $SO_2$, the pH will drop, while an active sulfonation ingredient is being created. Depending upon how far the pH is allowed to drop, either sodium sulfite ($Na_2SO_3$) or sodium bisulfite ($NaHSO_3$) is obtained. $Na_2SO_3$ formation occurs during the inital stages of this reaction but as the pH continues to decline, it will react further and form in conjunction with water, portions of $NaHSO_3$. The formation of the sodium salts necessary for sulfonation may be expressed by the following imperical formulae:

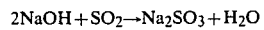

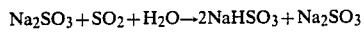

The ratio of $NaHSO_3$ to $Na_2SO_3$ will continue to increase as the pH continues to decline. At the preferred pH of 6.1-6.3, which is the starting point of the sulfonation step, the majority of the sulfite corresponds to the desired $NaHSO_3$ form.

Since low sulfonated, low electrolyte-containing lignin products of the present invention utilize an $NaHSO_3$ loading of 1 mole per 1,000 grams lignin, it has been found that if the methylolation step in alkaline region is carried out at a pH of about 10.6, an almost exact quantity of the $SO_2$ reactant is available at pH of 6.1-6.3 for the sulfonation reaction.

In instances where a higher sulfonated lignin product (1.6 mole per 1,000 grams lignin) is desired, the methylolation pH should be about 11. For instances where an even higher sulfonated product is desired, further direct addition of a sodium sulfite salt in excess of the amounts generated during the pH adjustment step with $SO_2$ is employed under superatmospheric conditions. This may be accomplished by the addition of $NaHSO_3$ or, preferably, by the addition of sodium metabisulfite in equivalent amounts to provide the degree of sulfonation desired.

To avoid premature sulfonation occurring during the $SO_2$ addition and pH lowering step of the methylolated lignin, it is desirable that the pH lowering step with $SO_2$ be carried out without the addition of heat, or at about ambient temperatures.

The method of producing sulfonated products of the present invention may be exemplified by the following steps:

(1) The precipitated lignin by-product of the black liquor of a kraft pulping process is slurried in aqueous solution to obtain a 20% lignin solids content.

(2) The pH of the slurry is adjusted with NaOH to between about 10.0 to 11.2, preferably about 10.6–11.0.

(3) 0.5 to 3 moles $CH_2O$ per 1,000 grams lignin are added to the slurry, preferably 1.8 to 2.7 moles.

(4) The lignin slurry is methylolated for 2 hours at a temperature of 55° C.–80° C., preferably 70° C.

(5) Sulfur dioxide ($SO_2$) gas is bubbled through the methylolated lignin slurry in sufficient amount to reduce the pH of the slurry to the preferred pH range of about 6.1 to 6.3. During addition of the $SO_2$, the slurry is maintained at about ambient temperatures.

(6) The total solids content of the slurry is determined, the slurry titrated for free sulfite, and NaHSO3 added, if needed, to increase the degree of sulfonation, if such is desired.

(7) The slurry is then heated, at atmospheric conditions, at 90°–100° C., preferably 98° C., for from 2 hours to 20 hours, preferaby 8 hours, cooled, and the properties thereof, e.g., pH, precipitation pH, solids, viscosity, determined. Under superatmospheric conditions, the temperature is raised to between 105° C.–180° C., preferably 140° C., for from 10 minutes to 10 hours, preferably 2 hours.

(8) The slurry is filtered and liquid evaporated therefrom by spraydrying to obtain the final solid composition product.

Samples of products of the present invention produced generally in accordance with the above-described method were tested for product viscostiy and electrical conductance and compared with sodium salts of sulfomethylated lignins produced in accordance with the water-washing method of my aforesaid co-pending parent U.S. patent application. The following test procedures were employed. For electrical conductance, a 5% solids lignin product solution was prepared in water. The pH was adjusted to pH 8 with dilute sulfuric acid. If the product pH was below pH 8, no adjustments were made. The conductivity of the product was then determined by a conductance meter Model 31 manufactured by Yellow Springs Instrument Company.

To obtain viscosity measurements, each sulfonated lignin product was solids-adjusted to about 25%, heated to about 70° C., and glacial acidic acid was added slowly until a pH of 7 was obtained. The liquid composition then was adjusted to a temperature of 25° C. A Brookfield viscometer (Model LVT) was employed for all measurements.

The results of comparisons of the properties of sulfomethylated lignin salt of the present invention and that produced by the method of my aforesaid co-pending application are set forth in the following table:

TABLE I

| Process: From Black Liquor | Methylolation pH | pH Precip. Point of 2% Solution | Product Visc. at 25% Solids Content, 25° C., pH 7 (cps) | Product Conductance 5% Solids Content pH 7.0 (m mhos) |
|---|---|---|---|---|
| Lignin Product of the Present Invention | 10.6 | 1.48 | 15 | 5,500 |
| Lignin Product Produced by Water-washing Method to Remove Electrolytes | 11.0 | 1.3–1.5 | 45 | 5,300 |

From the foregoing description of preferred methods and embodiments of the present invention, it can be seen that the present invention provides for the production of sodium lignosulfonate salts which have substantially equivalent electrolyte content as those produced in accordance with the method of my aforesaid co-pending patent application, and without the necessity of an acid reduction lignin filtration and water-washing step to remove inorganic salts and electrolytes therefrom.

That which is claimed is:

1. A method of producing sodium salts of low electrolyte-containing lignosulfonates suited for use as dye and print paste additives comprising the steps of:
   (a) preparing an aqueous solution of a sodium salt of a lignin material;
   (b) methylolating the lignin at a pH level of between about 10.0 to 11.2, by the addition of a methylolating component;
   (c) adding sulfur dioxide to the methylolated lignin to lower the pH of the lignin solution to a pH of between about 2 to 7 producing a lignin slurry; and
   (d) heating the methylolated lignin slurry at said lower pH level to sulfonate the methylolated lignin therein.

2. The method as defined in claim 1 wherein the sodium salt lignin material is a by-product of the black liquor residue of a kraft pulping process.

3. The method as defined in claim 1 including the further step of recovering the sodium salt of the sulfomethylated lignin as a solid product by spray-drying.

4. The method as defined in claim 1 wherein the methylolating component for the lignin is formaldehyde.

5. The method a defined in claim 1 wherein the sulfur dioxide addition produced a lignin slurry of a pH from 6.1 to 6.3.

6. The method as defined in claim 1 wherein the sulfonation step is carried out at a pH level of the lignin slurry of about 6.1 to 6.3.

7. The method as defined in claim 1 wherein a sulfonated lignin product containing about 1 mole of organically bound sulfur per 1,000 grams lignin is produced by conducting step (b) at pH 10.6.

8. The method as defined in claim 1 wherein a high sulfonated lignin product, containing about 1.6 moles of organically bound sulfur per 1,000 grams lignin, is produced by conducting step (b) at pH 11.

9. The method as defined in claim 1 wherein a higher sulfonated lignin product containing greater than about 1.6 moles of organically bound sulfur per 1,000 grams lignin by adding additional sodium hydroxide to the methylolated lignin product of step (b) under superatmospheric conditions.

10. The method as defined in claim 1 wherein a higher sulfonated lignin product containing greater than about 1.6 moles of organically bound sulfur per 1,000 grams lignin by adding additional sodium bisulfite or sodium sulfite to the lignin slurry of step (c) under superatmospheric conditions.

11. The method as defined in claim 1 wherein the lignin is methylolated by addition of 0.5 to 3 moles formaldehyde per 1,000 grams solids in the slurry.

12. The method as defined in claim 1 wherein the addition of sulfur dioxide to the methylolated lignin to reduce the pH level of the slurry is carried out at ambient temperature conditions.

13. The sodium salt of a low electrolyte-containing sulfomethylated lignin prepared in accordance with the method of claim 1.

14. A dyestuff composition comprising a dye and as a dispersant therein the product of claim 13.

15. The method as defined in claim 1 wherein the lignin material is selected from the group consisting of sulfate lignins and sulfite lignins.

16. The method as defined in claim 15 wherein the sulfate lignin material is kraft lignin.

* * * * *